Aug. 25, 1953  E. C. ABT  2,649,984
BOTTLE CONTAINING TROPHY AND BEVERAGE SHAKER
Filed April 6, 1950
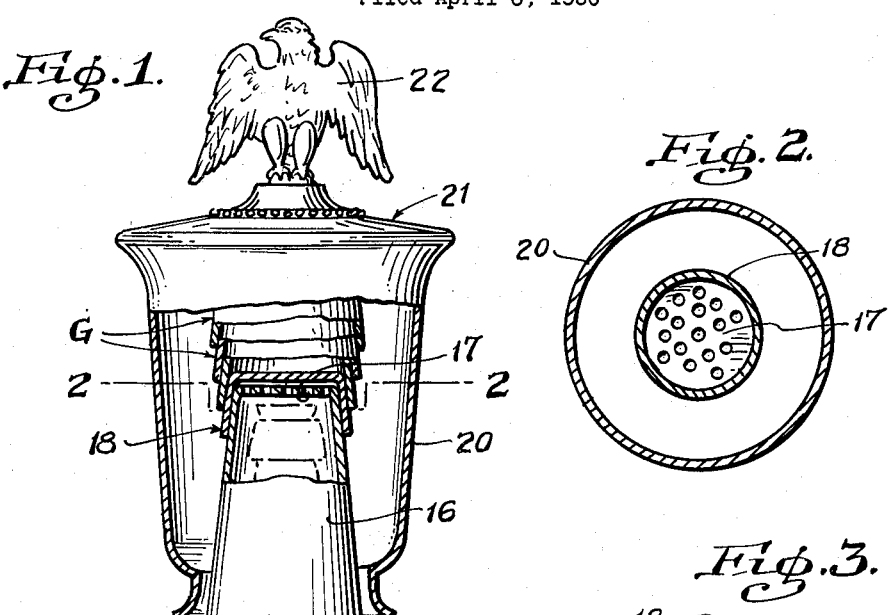
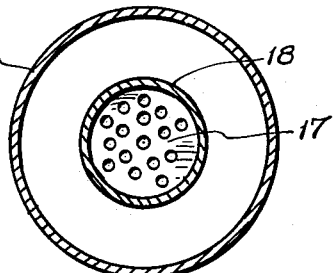
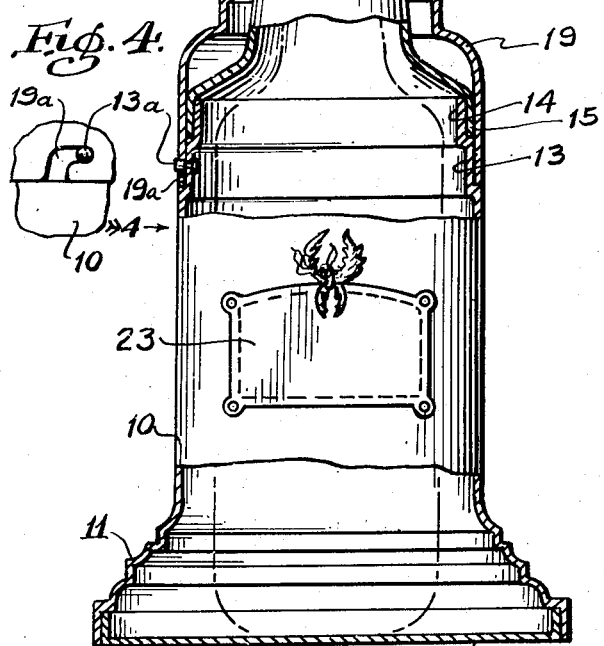
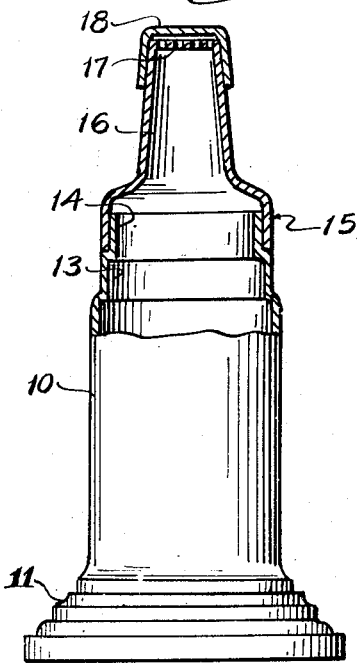
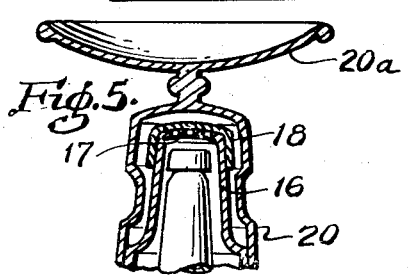
INVENTOR.
EDWARD C. ABT
BY
Martin P. Smith
ATTORNEY.

Patented Aug. 25, 1953

2,649,984

UNITED STATES PATENT OFFICE 2,649,984

BOTTLE CONTAINING TROPHY AND
BEVERAGE SHAKER

Edward Charles Abt, Los Angeles, Calif.

Application April 6, 1950, Serial No. 154,373

1 Claim. (Cl. 220—1)

The principal object of my invention is to provide a simple container composed of several parts, capable of ready assembly or disassembly and which structure when properly assembled providing a convenient and compact housing for a beverage containing bottle, with the contour of the complete container simulating and giving the appearance of a trophy, thus enabling the container and its contents, properly packed to serve as an attractive and interesting gift package.

A further object of my invention is to construct certain parts of the container so that they may be combined and used as a shaker and mixer for potables, particularly, those cooled with cracked ice.

With the foregoing and other objects in view, my invention consists in certain novel features of construction and arrangement of parts which will be hereinafter more fully described and claimed and illustrated in the accompanying drawing, in which:

Fig. 1 is a side elevational view of my improved bottle containing trophy and beverage shaker with parts broken away and in section.

Fig. 2 is a horizontal section taken on the line 2—2 of Fig. 1.

Fig. 3 is an elevational view, partly in section and showing parts of the container assembled to provide a beverage shaker and mixer.

Fig. 4 is a detail elevational view taken looking in the direction of the arrow in Fig. 1 and showing a bayonet joint connection between the lower body member of the container and the base portion of the cup shaped upper member.

Fig. 5 is a vertical cross section showing a modified form of the upper cup shaped member.

Referring by numerals to the accompanying drawing which illustrates a preferred embodiment of my invention, 10 designates the lower body member which may be formed from thin sheet material, preferably metal, cylindrical in shape, with the lower portion of the wall flared outwardly and circumferentially beaded to form an attractive decorative base 11.

A plate 12 is secured within the lower portion of base 11, thus closing the lower end of body 10.

A short circumferential portion 13 of the wall of body 10, near its upper end is inset from said wall a distance approximately equal to the thickness of the wall and that portion 14 of the body above said inset portion 13 is likewise inset a corresponding distance.

The lower circumferential portion 15 of an inverted funnel shaped member 16 is adapted to slip fit on portion 14 at the upper end of the wall of cylinder 10 and the upper end of said member of reduced diameter, is closed by a perforated plate 17.

A cap 18 removably mounted on the upper end of member 16 provides a closure for the apertures in plate 17.

The cylindrical base portion 19 of a cup shaped upper container member 20 which forms a cover is removably positioned on the inset portion 13 of the wall of member 10, and this member encloses the funnel shaped member 16. A slightly convex plate 21 closes the top of the cup shaped member 20 and surmounting said plate is a decoration 22, which may be a figurine, the small simulation of a bird, animal, flower or the like, or replicas of paraphernalia used in sports and the playing of games, for instance, crossed golf clubs, tennis rackets, baseball bats, oars or firearms, thus adding to the attractive appearance of the container and imparting thereto the general effect of a trophy.

To add to the utility of the bottle holder when packaged as a gift, a plurality of small drinking glasses G nested and inverted may be placed on cap 18, as shown in Fig. 1.

To add to the appearance of the holder, a portion of the external face of body member 10 may be formed by engraving or embossing, to provide a decorative panel 23, adapted to receive an inscription such as a name, dates or a salutation. If desired, base member 10 instead of being cylindrical in shape may be square or polygonal.

By removing upper member 20, the parts 10, 16 and 18 assembled as shown in Fig. 3 provide an effective beverage shaker and mixer and after the mixing function, cap 18 is removed to permit straining the beverage through the perforations in plate 17.

Base portion 19 of member 20 may have a fairly snug slip fit with the inset portion 13 of base member 10, and lower portion 15 of member 16, or if a positive connection is desired between portion 19 and base 10, a conventional bayonet joint comprising a stud 13a seated in member 13 and adapted to engage in an inverted L-shaped slot 19a formed in member 19 may be employed (see Fig. 4).

In Fig. 5, I have shown a modified construction wherein upper member 20 receives and forms a housing for the upper portion of member 16 and mounted on top of said upper member, is a shallow outwardly flared receptacle 20a adapted to receive compotes and like delicacies.

Thus, it will be seen that I have provided a bottle containing trophy and beverage shaker that is simple in structure, inexpensive of manufacture and very effective in performing the functions for which it is intended.

Minor changes in the size, form and construction of the various parts of my improved container may be made and substituted for those herein shown and described without departing from the spirit of my invention, the scope of which is set forth in the appended claim.

I claim as my invention:

A bottle containing trophy and beverage shaker comprising a receptacle having a pair of inset shouldered portions at its upper end, an inverted funnel shaped member having its lower end connected by a slip joint with the upper one of said shouldered portions, the upper end of said inverted funnel shaped member being perforated, a removable cap closing said perforated upper end, a series of individually usable nested cups removably positioned on top of said cap, a second inverted cup shaped member providing a cover for said first mentioned inverted cup shaped member and with a bayonet joint between said second mentioned inverted cup shaped member and the lowermost shouldered portion of said receptacle.

EDWARD CHARLES ABT.

References Cited in the file of this patent

UNITED STATES PATENTS

| Number | Name | Date |
|---|---|---|
| 300,867 | Hauck | June 24, 1884 |
| 740,446 | Lattard et al. | Oct. 6, 1903 |
| 1,202,642 | Allen | Oct. 24, 1916 |
| 1,254,655 | Carpenter | Jan. 29, 1918 |
| 1,665,179 | Savage | Apr. 3, 1928 |
| 1,721,506 | Bass | July 23, 1929 |
| 1,750,334 | Stern | Mar. 11, 1930 |
| 1,969,386 | Reichenbach | Aug. 7, 1934 |
| 2,019,535 | Herr | Nov. 5, 1935 |
| 2,203,880 | Schindelbeck | June 11, 1940 |
| 2,419,291 | Senter, Jr. | Apr. 22, 1947 |

FOREIGN PATENTS

| Number | Country | Date |
|---|---|---|
| 104,746 | Great Britain | Mar. 19, 1917 |